Dec. 18, 1923.  1,478,288
J. MacGREGOR
GAUGE FOR INDICATING THE DRAFT OF SHIPS
Filed Oct. 16, 1922    4 Sheets-Sheet 1
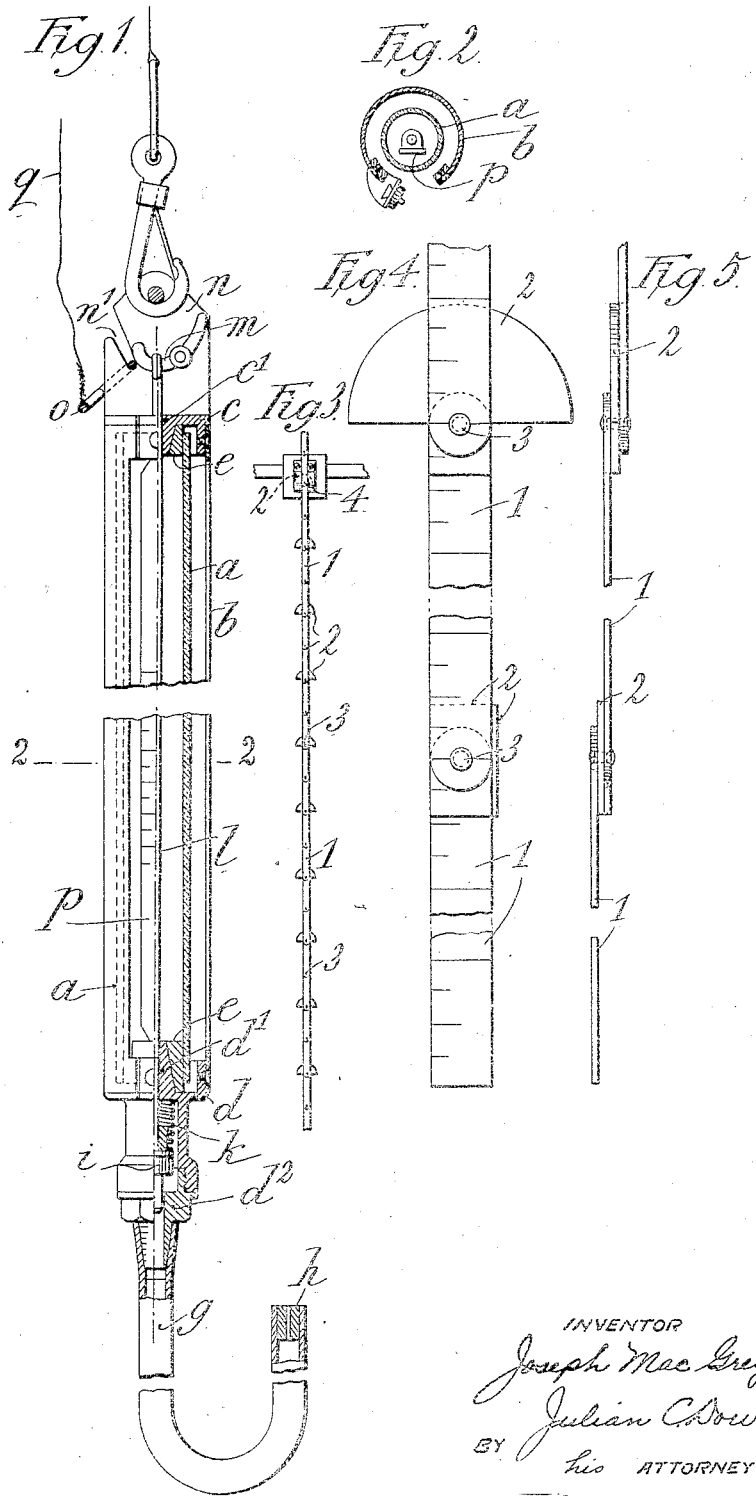

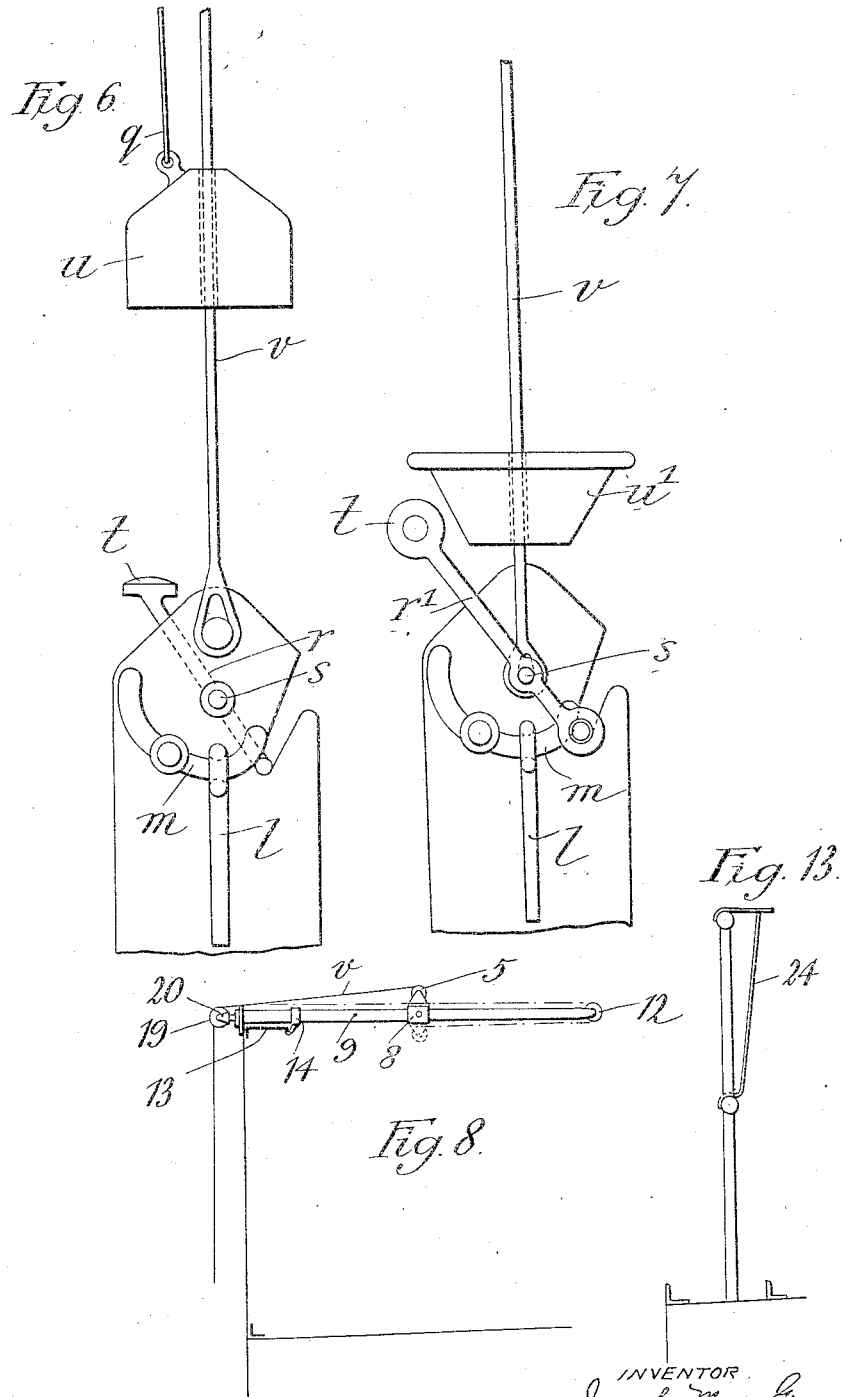

Dec. 18, 1923. 1,478,288
J. MacGREGOR
GAUGE FOR INDICATING THE DRAFT OF SHIPS
Filed Oct. 16, 1922  4 Sheets-Sheet 3
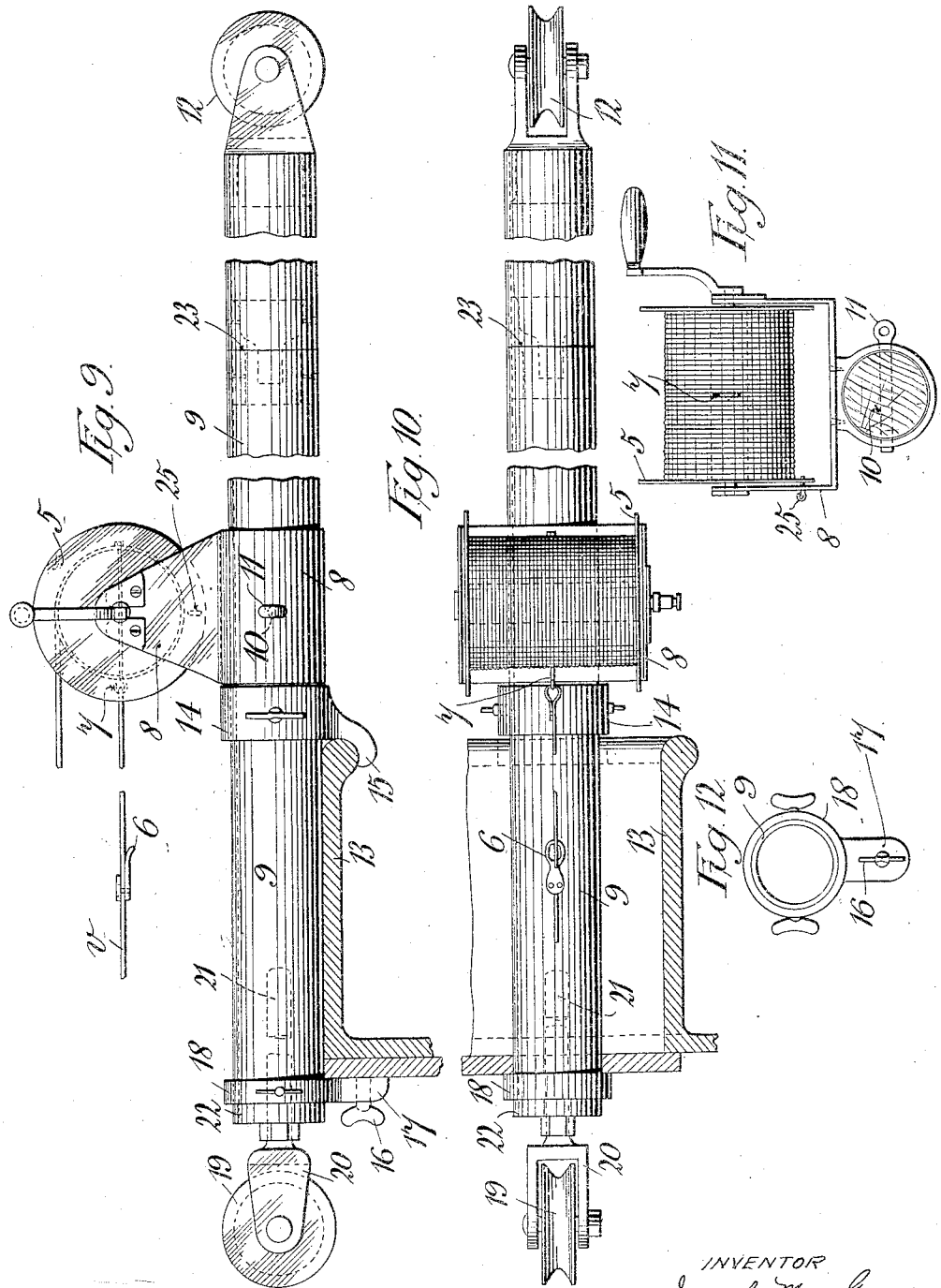
INVENTOR
Joseph MacGregor
BY Julian C. Dowell
his ATTORNEY

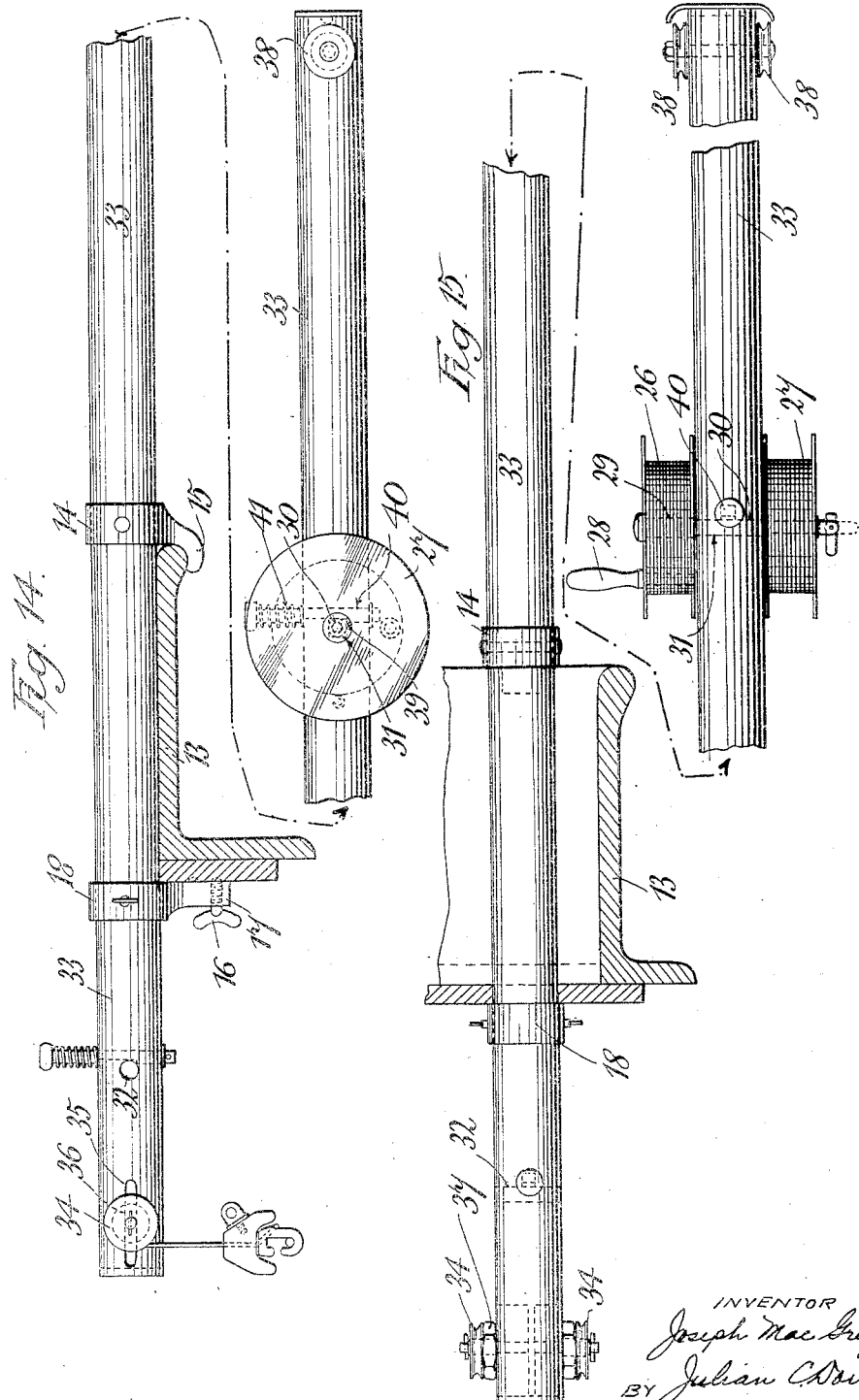

Patented Dec. 18, 1923.

1,478,288

UNITED STATES PATENT OFFICE.

JOSEPH MacGREGOR, OF NORTH SHIELDS, ENGLAND.

GAUGE FOR INDICATING THE DRAFT OF SHIPS.

Application filed October 16, 1922. Serial No. 595,011.

*To all whom it may concern:*

Be it known that I, JOSEPH MACGREGOR, a subject of the King of Great Britain and Ireland, residing at North Shields, in the county of Northumberland, England, have invented Improvements in Gauges for Indicating the Draft of Ships, of which the following is a specification.

This invention has reference to gauges, for enabling the draft and dead weight of ships to be determined, of the kind such as forms the subject of my British Letters Patent No. 21,179 of 1913, comprising a glass tube adapted to be suspended over the ship's side in the water which rises in the tube to the level of the surrounding water, the water being retained in the tube by the closing of a valve so that the gauge can be hauled on deck and a comparison made of the level of the water in the tube which represents the actual draft of the vessel with a dead weight scale.

One of the objects of the present invention is to provide a device of the kind referred to in which the valve at the time of lowering the gauge is normally open in lieu of normally closed as heretofore proposed, by which means it is unnecessary to arrange for temporarily anchoring the device to the side of the ship to permit water to enter the gauge.

Another object of the invention is to provide means of a simple and effective character for releasing the valve of the gauge when it is to be closed. Further objects of the invention are to provide improved means for suspending the gauge over the ship's side with the power to vary the suspension distance by definite amounts.

Referring to the accompanying drawings which illustrate the invention,

Fig. 1 shows the gauge half in section and half in elevation, with one form of valve releasing means, and; Fig. 2 is a cross section on the line 2—2.

Fig. 3 is an elevation of jointed suspension means for such gauge and Figs. 4 and 5 are views at right angles to one another of a portion of same to a larger scale.

Figs. 6 and 7 are elevations of other modified valve releasing arrangements. Fig. 8 is a diagrammatic view of another arrangement for suspending the gauge. Fig. 9 is a view to a larger scale of a portion of Fig. 8, parts being broken away. Fig. 10 is a corresponding plan. Fig. 11 is a transverse section of Fig. 9. Fig. 12 is an end view of Fig. 9 with parts removed. Fig. 13 is a diagrammatic view of a modified detail. Fig. 14 is a side elevation and Fig. 15 a plan of an alternative constructional arrangement.

Referring first to Fig. 1, $a$ is the glass or celluloid gauge tube encased in a metal tube $b$ formed with a long slit through which the tube $a$ can be viewed; the tubes $a$ and $b$ are held in metal caps $c$ and $d$ formed with central apertures $c^1$ and $d^1$, water tight joints being formed by rubber packing pieces $e$ as shown. The bottom cap $d$ has screwed into it a valve seating piece $d^2$ formed with a nipple having fixed to it a length of flexible tubing $g$ the end of which is fitted with a metal plug $h$ formed with a small hole through which water passes to the gauge from a depth well below the disturbed surface of the water in which it is immersed.

Within the cap $d$ is a valve $i$ pressed towards the seating $d^2$ by a spring $k$ and carried by a rod $l$ extending freely through the aperture $d^1$, tube $a$ and aperture $c^1$ in the top cap $c$. The upper end of the rod $l$ is formed as an eye through which passes a catch in the form of a curved hook $m$ pivoted between cheeks $n$ projecting from the cap $c$ and formed with slots $n^1$ in which rests a ring-like stop $o$ attached to a cord $q$ and serving to prevent the hook turning to release the valve; on pulling the cord $q$ the stop $o$ is completely withdrawn and detached from the gauge, the rod $l$ thus being released and the valve permitted to close under the action of its spring $k$.

The gauge may be provided with suitable scales for instance such as are described in the specifications of my British Letters Patent No. 134,778 and No. 154,687; in the example a scale $p$ graduated in inches is held within the tube $a$ between the caps $c$ and $d$ and this scale is conveniently formed at the back with guide eyes through which the rod $l$ slides.

In Fig. 6 the hook $m$ which as before engages the eye of the rod $l$ of the gauge is normally held by a lever $r$ pivoted to the gauge at $s$ and having a head $t$ situated in the path of a weight $u$ having a central passage through which a suspension rope $v$ extends. This weight is shown as attached to the cord $q$ by which it can be lowered on to the lever head $t$. The rocking of the lever which thus results liberates the catch.

In Fig. 7 a similar weight $u^1$ is allowed to descend freely by gravity to engage a similar catch releasing lever $r^1$ the gauge suspension rope $v$ being connected to the pivot of the lever.

With a gauge the valve of which is adapted to be released by the means shown in Fig. 1, a rope such as is used at $v$ in Figs. 6 and 7 may be replaced by suspension means as shown in Figs. 3, 4 and 5, comprising a number of flat metal strips 1 connected together with interposed stop pieces 2 by rivets 3. Each stop piece is secured to one strip and has a projection or set up part at one side which prevents the strips being folded to that side, and each alternate stop piece is formed with lateral extensions as shown adapted to engage in a housing 4 fixed to the hand rail. The strips are preferably foot lengths marked in inches.

A more advantageous method and means for suspending the gauge is that shown in Figs. 8 to 12 where a gauge suspending rope or wire $v$ is chosen of a total length which will enable say 18 feet to be effectively available when fully unwound from a reel 5 and which is provided with an eye 6 arranged so that when say 6 feet of the rope is unwound it can be engaged with a hook 7 upon the reel leaving 12 feet wound thereon. From this it will be understood that either 18 feet or 6 feet of rope and no more can be made available when the reel comes to rest under the pull of the rope. The said reel is carried by a sleeve 8 adjustable along a support which is shown as in the form of a metal tube 9 provided with holes 10 spaced two feet apart at any one of which it can be secured by a pin 11. One end of this tube carries a sheave 12 at a distance from the nearest hole 10 such that when moving the reel from a position above the tube at this hole 10, to an inverted position below the hole at the same point there will be a movement of the rope $v$ equivalent to two feet. It will thus be seen that, assuming the whole 18 feet of rope to be unwound from the reel the gauge will be suspended over the ship's side to that extent when the reel is fixed above the tube at the hole 10 remote from the sheave 12 and that this length can be decreased by distances of two feet until the reel is finally brought back to the starting position but below the tube when the gauge will be suspended 8 feet over the ship's side. If then further variation is desired the wire can be wound up on the reel until the eye 6 can be applied to the hook 7 whereupon only six feet of rope can be unwound, this length being decreased by once again moving the reel along the tube from the end remote from the sheave.

The tube $q$ can be clamped to the bulwark rail 13 in any convenient way such as by means of the adjustable collar 14 which has a rail-engaging horn 15 and a pinching screw 16 extending through a lug 17 upon a second adjustable collar 18 upon the tube. The rope $v$ as it proceeds from the reel passes over an outboard sheave 19 the carrier 20 of which has a screw threaded stem 21 whereby it can be adjusted in relation to a head 22 of the tube to compensate for stretch of the rope.

For convenience the tube 9 is made in two parts adapted to be screwed together as shown at 23.

If the bulwark rail is not naturally suited to receive the fastening means of the tube 9, a seating 24 as shown in Fig. 13 may be provided therefor. 25 is a pin which may be employed to check the reel if desired.

A direct modification of the last referred to arrangement is shown in Figs. 14 and 15 where a pair of reels 26, 27 are mounted, for simultaneous rotation by a handle 28, upon the squared ends 29 of an otherwise round pin 30 which is adapted to be received by either of two holes 31, 32 spaced two feet apart along a tube 33. With each reel is associated an outboard sheave 34 the axle of which is adjustable along a slotted way 35 by an internal slide block 36, and external nut 37, a corresponding but non-adjustable sheave 38 being fitted at the opposite end of the tube. The reel 26 may be assumed to carry a length of rope which when unwound directly over the corresponding outboard sheave 34, whilst the reel combination occupies the position at hole 31, will allow 22 feet to hang over the ship's side. At position 32, under like conditions, 20 feet will be available. If unwound from position 32 after first passing under sheave 34, the amount of rope available will be 18 feet, whilst a further reduction to 16 feet follows a change in position once more to position 31. The other reel 27 in such an example would accommodate a rope which at one time would allow 14 feet to hang over the ship's side with the choice of reducing same by two foot lengths to 8 feet.

For the purpose of releasing the reel or controlling descent of the gauge, braking means may be employed, the intermediate round portion of the reel pin 30 being shown as normally engaged by the shoulder 39 of a square pin 40, (at each hole 31, 32) which shoulder is formed by cutting a gap therein. To remove or lessen the frictional drag thus imposed upon the pin 30 the pin 40 is depressed against the action of a spring 41.

What I claim is:—

1. A draft gauge of the kind referred to, comprising a hollow body adapted to be water immersed, means for suspending same from a ship, a valve permitting entry of water into the body when immersed, means for holding the valve open and means controlled from the ship for releasing the holding means and thereby permitting the valve to close and imprison water in the body, substantially as described.

2. A draft gauge of the kind referred to, comprising a long hollow body, means for suspending same vertically, a valve seat at the lower end of the body controlling a passage leading into the interior of such body, a valve, a spring tending to move the valve towards its seat, a member attached to the valve and extending through the body to a point near the suspension means, a pivotal catch engaging such connection, a device adapted to be set to engage the catch and hold it in valve-open position and means for dislodging the said catch engaging device when it is desired that the spring shall be liberated to close the valve, substantially as described.

3. A draft gauge of the kind referred to, comprising a body, means for suspending said body, valve means upon the body, a pivotal catch engaging and adapted to hold the valve means in valve-open position, a pivotal member adapted to be set to hold the catch in the position referred to and a weight adapted to descend the suspension means and thereby trip the catch engaging device so that the valve can close, substantially as described.

4. A draft gauge of the kind referred to, comprising a body, means for suspending said body, valve means upon the body, a pivotal catch engaging and adapted to hold the valve means in valve-open position, a pivotal member adapted to be set to hold the catch in the position referred to, a weight adapted to descend the suspension means and thereby trip the catch engaging device so that the valve can close, and means whereby descent of the weight can be controlled, substantially as described.

5. In combination, a gauge suspending flexible connection, a reel therefor, support for such reel and means whereby the reel can be held at different definite positions upon said support so as to enable a constant predetermined length of the flexible connection to be unwound from the reel at each separate position occupied by the latter, substantially as and for the purpose set forth.

6. In combination a gauge suspending flexible connection, a reel therefor, a support for such reel and means whereby the reel can be held at different definite positions upon said support, so as to enable a constant predetermined length of the flexible connection to be unwound from the reel at each separate position occupied by the latter and means for altering the amount of flexible connection that can be thus unwound from the reel, substantially as described.

7. In combination, a gauge suspending flexible connection, a reel therefor, a horizontally arranged support for the reel, a sheave at one end of such support, to which the flexible connection can be led directly from the reel and a sheave at the opposite end of the support around which the flexible connection can be alternately led before it reaches the first named sheave, substantially as and for the purpose described.

8. In combination, a gauge suspending flexible connection, a reel therefor, a horizontally arranged support for the reel, a sheave at one end of such support to which the flexible connection can be led directly from the reel, a sheave at the opposite end of the support around which the flexible connection can be alternately led before it reaches the first named sheave and means for holding the reel at different positions along said support, substantially as described.

Signed at Lloyd Bank Chambers King Street in the borough of South Shields in the county of Durham England this eighteenth day of September 1922.

JOSEPH MacGREGOR.